United States Patent
Cellier et al.

(10) Patent No.: US 6,325,332 B1
(45) Date of Patent: *Dec. 4, 2001

(54) COORDINATABLE SYSTEM OF INCLINED GEOSYNCHRONOUS SATELLITE ORBITS

(75) Inventors: Alfred Cellier; Raul D. Rey, both of Rancho Palos Verdes, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,199

(22) Filed: Nov. 19, 1999

Related U.S. Application Data

(63) Continuation of application No. 08/876,278, filed on Jun. 16, 1997.

(51) Int. Cl.$^7$ .................................................. B64G 9/00
(52) U.S. Cl. ........................................................ 244/158 R
(58) Field of Search ...................... 244/158 R; 455/12.1, 455/13.1, 13.2, 13.3; 342/356

(56) References Cited

U.S. PATENT DOCUMENTS

| | | |
|---|---|---|
| 3,497,807 | 2/1970 | Newton . |
| 4,691,882 * | 9/1987 | Young . |
| 4,809,935 | 3/1989 | Draim . |
| 5,119,225 * | 6/1992 | Grant et al. . |
| 5,120,007 * | 6/1992 | Pocha et al. ............... 244/158 R |
| 5,551,624 | 9/1996 | Horstein et al. . |
| 5,619,211 * | 4/1997 | Horkin et al. . |
| 5,641,134 | 6/1997 | Vatt . |
| 5,669,585 | 9/1997 | Castiel et al. . |
| 5,810,297 * | 9/1998 | Basuthakur et al. . |
| 5,867,783 | 2/1999 | Horstein et al. . |
| 5,871,181 | 2/1999 | Mass . |
| 5,979,830 * | 11/1999 | Kellermeier . |

OTHER PUBLICATIONS

Chiba, I., et al. "Inclined Geo Satellite Communication System With Deployable Phased Array Antennas" (1997) AIAA pp. 243–249.

Effects of NGSO Provisional EPFD, APFD Limits on "Quasi–Geostationary Systems" (1998) ITU.

* cited by examiner

*Primary Examiner*—Charles T. Jordan
*Assistant Examiner*—Tien Dinh
(74) *Attorney, Agent, or Firm*—Vijayalakshmi D. Duraiswamy; Michael W. Sales

(57) ABSTRACT

A coordinatable system of geosynchronous (24-hour), inclined, and slightly elliptical satellite orbits enables spectrum re-use by forming "highways" of moving "slots" in the latitudes above and below the geostationary (GSO) belt worldwide. Each of a plurality of repeating ground tracks is shared by multiple satellite orbits (and thus slots). These are phased to achieve minimum specified angular separation from other slots using the same frequencies. Ground track (and thus orbital) parameters are chosen to realize specified shapes and are located at specified longitudes of symmetry to maximize the total number of slots. Consideration is given to specified constraints on service area coverage, elevation angle, and time coverage.

7 Claims, 5 Drawing Sheets

COORDINATABLE SYSTEM OF INCLINED GEOSYNCHRONOUS SATELLITE ORBITS

This is a continuation of parent application filed on Jun. 16, 1997 with Ser. No. 08/876,278.

TECHNICAL FIELD

This invention relates generally to coordinatable systems of geosynchronous satellite orbits and particularly to such systems wherein planes defined by the satellite orbit are inclined with respect to the Earth's equatorial plane and wherein the satellites are respectively phased in a systematically coordinated fashion that enables and promotes frequency re-use.

BACKGROUND ART

Satellites in geostationary orbits (GSO's) have been widely preferred for several decades because of the economic advantages afforded by such orbits. In a geostationary orbit, a satellite traveling above the Earth's equator, in the same direction as that in which the Earth is rotating, and at the same angular velocity, appears stationary relative to a point on the Earth. These satellites are always "in view" at all locations within their service areas, so their utilization efficiency is effectively 100 percent. Antennas on Earth need be aimed at a GSO satellite only once; no tracking system is required.

Coordination between GSO's and with terrestrial services is facilitated by designated allocation of designated "slots" angularly separated according to service type.

Given the desirability of geostationary satellite orbits and the fact that there are only a finite number of available "slots" in the geostationary "belt," the latter has been essentially saturated with satellites operating in desirable frequency bands up through the Ku-band (up to 18 GHz). AS a result, the government has been auctioning the increasingly scarce remaining slots. This has encouraged the development of complex and expensive new systems including those using low Earth orbits (LEO's), medium Earth orbits (MEO's), and higher frequencies, for example, the Ka-band (up to (approximately) 40 GHz).

Growth to higher frequencies is limited by difficult problems of technology and propagation, and expansion in satellite applications requires exploitation of the spatial dimension (i.e., above and below the GSO belt). A host of proposed LEO and MEO systems exemplify this direction.

The recently filed LEO and MEO system applications, however, introduce a significant problem. Frequency coordination and sharing are made difficult by the unstructured criss-crossings of the lines of sight of these systems. This has the potential of severely impeding effective spectrum use with nongeostationary orbits (NGSO) in general.

There has been no known prior effort to exploit coordinatable systems of inclined geosynchronous orbits (IGO's) in a systematic manner, even though the unused domain of inclined geosynchronous orbits offers great potential for the coordinatable growth of satellite service.

The prior art that bears the closest resemblance to the disclosed invention is the original, 12-hour, elliptic orbit, Soviet communications satellites (Molniya 1A, April 1955) that shared a common ground track with three or four satellites per group. Over the years, a number of Cosmos satellites employed these highly elliptic Molniya orbits (44,000 km apogee, 400 km perigee, inclined 63 degrees to minimize apsidal drift) for military purposes. Significant differences and limitations (compared with the present invention) of these 12-hour orbits include unavoidable inter-track crossings that prohibit coordinatable growth, low coverage efficiency for a given region, limited operating life due to the atmospheric drag attending a low-perigee orbit, and radiation belt traversal. The 12-hour period also requires handoff at least four times daily. For these reasons, these orbits do not lend themselves to a large coordinated system with region focus.

Listings of current orbital parameters show many older satellites that have deteriorated into inclined geosynchronous orbits, but this is due simply to the exhaustion of station-keeping fuel.

While the various prior techniques function with a certain degree of competence, none discloses the advantages of the coordinatable system of geosynchronous satellite orbits of the present invention as is hereinafter more fully described

DISCLOSURE OF THE INVENTION

An object of the present invention is to provide a framework for the growth of geosynchronous satellite services accommodating multiple service operations.

Another object is to enable frequency re-use of spectrum from regional (geosynchronous) satellites in an easily coordinated manner analogous to that of geostationary services.

Yet another object is to avoid or delay the technical and financial challenges of moving to still higher frequencies for expansion.

Still another object is to provide predominantly specific hemispheric or regional coverage rather than global coverage.

An additional object is to provide a satellite system having a greater utilization efficiency than systems using low Earth orbits (LEO's) and systems using medium Earth orbits (MEO's).

An advantage of the present invention is that it provides an expanded use of spectrum up through C, Ku- and Ka-bands, using predominantly off-the-shelf hardware.

Another advantage is that the present invention avoids difficulties in frequency coordination and spectrum re-use, which are encountered with lower altitude (LEO and MEO) orbits.

A feature of the present invention is that it provides an orderly method for expanding the capacity of coordinatable orbit space by a large factor, in numbers exceeding the capacity of the geostationary (GSO) belt.

Another feature of the present invention is that it is capable of being tailored to center a service window for a specific service region with respect to an optimum time of day.

In realizing the aforementioned and other objects, advantages and features of the satellite communications system of the present invention, a plurality of coordinated and synchronized sets of moving "slots," each of which is a potential satellite location, is established.

The objects, advantages and features of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages and features thereof may be readily obtained by reference to the following detailed description when considered with the accompanying drawings in which like reference characters indicate corresponding parts in all the views, wherein.

Figure 1:
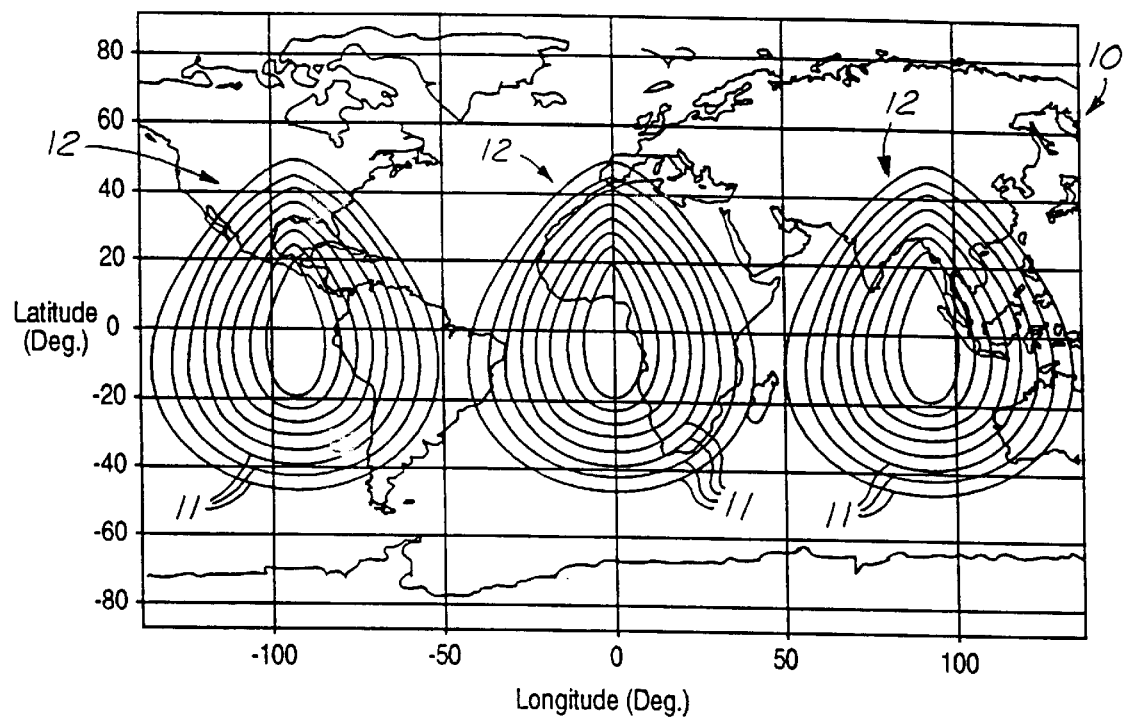
FIG. 1 is a graphic representation of an equirectangular projection map showing a possible set of multiple satellite ground tracks associated with satellite orbits populated by a plurality of satellites.

The objects, features and advantages of the present invention are readily apparent from the following detailed description of the best mode for carrying out the invention when taken in connection with the accompanying drawing figures.

BEST MODE FOR CARRYING OUT THE INVENTION

The essence of the present invention is the establishment of multiple sets of ground tracks that are interspersed, interleaved, and/or otherwise spaced on the Earth and are populated with multiple moving slots in a manner that maximizes the possible number of slots while maintaining a specified minimum angular separation between any two active slots at all times.

In the present invention, the coordinatable system of geosynchronous (24-hour), inclined, and slightly elliptical satellite orbits, enables spectrum re-use by forming "highways" of moving "slots" in the latitudes above and below the geostationary belt worldwide. Each of a plurality of repeating ground tracks, or highways, is shared by multiple satellite orbits, and thus slots, each phased to achieve minimum specified angular separation from other slots using the same frequencies.

Ground tracks are imaginary lines representing the loci of subsatellite points that are repeatedly traced on the surface of the Earth by lines extending from the center of the Earth to orbiting satellites. Ground track (and thus orbital) parameters are chosen to realize specified shapes and are located at specified longitudes of symmetry to maximize the total number of slots with consideration being given to specified constraints on separation angle, service area coverage, elevation angle and time coverage. Longitude of symmetry is a line of longitude about which a ground track is symmetrically disposed.

Multiple satellite systems, engaged in communications businesses, sensing, navigation, and the like, operate as constituent systems within the context of this highway structure with a minimum of coordination, as contrasted with the difficulties of frequency sharing experience with low Earth orbit (LEO) and medium Earth orbit (MEO) systems, and are freed from the capacity limits of the geostationary belt.

Preconfiguration of the elements of the satellite communications system of the present invention allows for an initial, partial coverage of a specified geographic region and for a systematic continuation of expansion over time until maximum capacity is reached. The systematic expansion provides predictable satellite positions and facilitates the coordination of all frequency hands with those of other communication stations, space, terrestrial and mobile, to provide a variety of services.

The constituent satellite communications systems in this mode perform with a greater utilization efficiency than systems using low Earth orbit and medium Earth orbit systems. The latter necessarily traverse oceans approximately 75 percent of the time, but the present system has a utilization efficiency of at least 50 percent.

The present coordinatable system provides for constituent systems to cover a specific range of longitudes rather than global coverage. This allows service to be specifically targeted and also allows incremental growth tailored to chosen market areas. The system is also designed to specifically position a service window to best advantage at an optimum time for a service region, with a design bias of hemispheric-specific (north-south) visibility arising from eccentricity.

For purposes of this disclosure, it should be understood that specific numerical values are introduced as examples and not as final design values. It should also be understood that, while potential orbits of a multiplicity of satellites are defined, moving slots are in fact being defined, each slot being capable of hosting at least one satellite, but which might be vacant or might contain one or more satellites of various service classes. For simplicity, the terms "satellite" and "slot" are used interchangeably herein.

Shown by FIG. 1 of the drawings is a graphic representation of a possible set of multiple satellite ground tracks, each potentially populated by multiple geosynchronous satellites. The background is an equirectangular-projection map of a major portion of the Earth, with the equator being represented by latitude line zero. The angular distances between adjacent lines of latitude are 20 degrees and those between adjacent meridians (at the equator) are 50 degrees. Inscribed upon this background are multiple ground tracks 11 in sets generally indicated by reference numeral 12.

Figure 2:
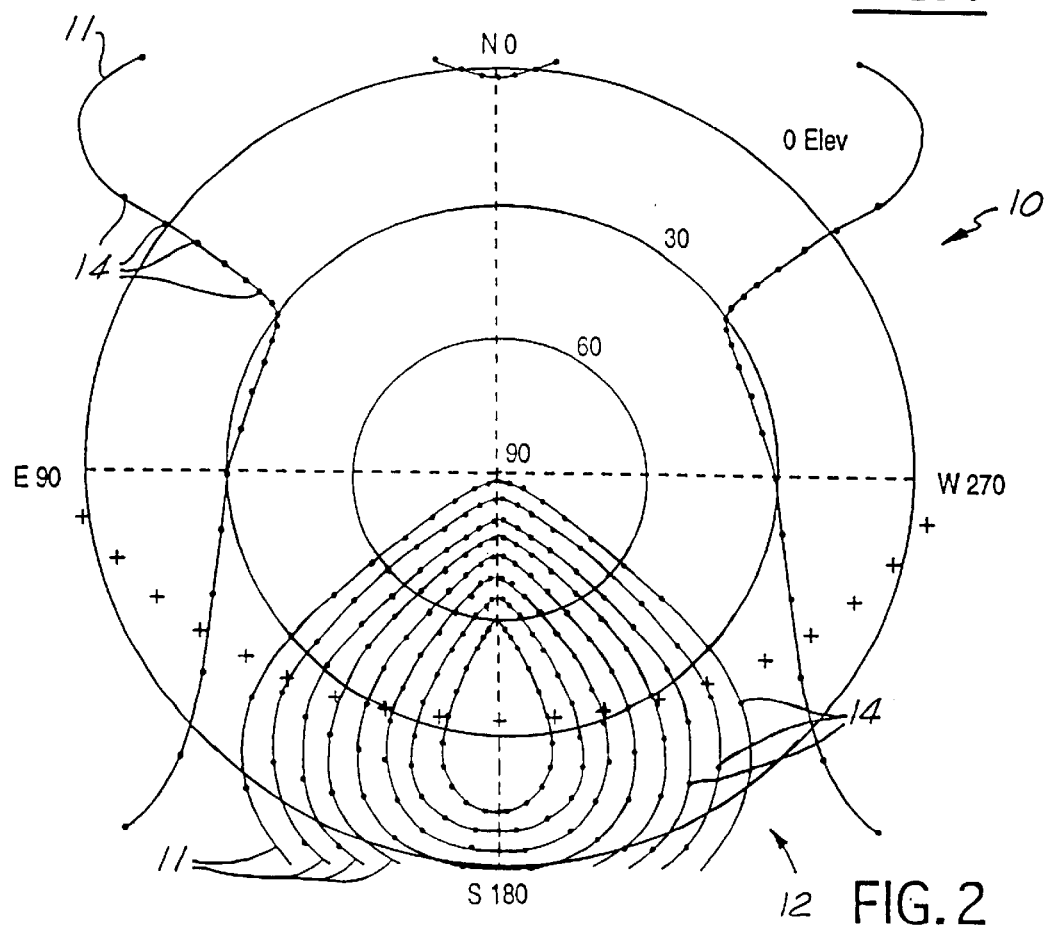
FIG. 2 is a graphic representation, in polar coordinates, of a portion of the ground tracks of FIG. 1 as viewed from a specific ground site.

FIG. 2 is a view from an observation position on the Earth's surface (at 50 degrees north and 0 degrees longitude) of the paths satellites associated with the ground tracks shown by FIG. 1 trace across the sky. Shown in the central set (also respectively indicated by reference numerals 11 and 12 for convenient comparison) and the outermost track of each of the sets 12 laterally disposed with respect thereto. The polar view places north at the top and east at the left; lines of constant elevation angle are circles about the origin (zenith, 90 degrees), and the horizon (zero elevation) is the outer circle.

An inherent measure of quality for any system of satellite positions is the minimum angular spacing between any two active satellites. This requirement differs according to the type of service due to associated antenna sizes; for example, the GSO Ku-band spacing is generally 2 degrees for Fixed Satellite Service (FSS) and 9 degrees for Broadcast Satellite Service (BSS). The structure of the present invention may have to be configured differently, for example, for use in more than one frequency band, to accommodate such diverse business applications.

The separation angle between two satellites is preferably expressed as viewed from the center of the Earth, which underbounds the values of the angle as seen from any point on the Earth's surface (and in particular from within a given service area) in sight of the two satellites. Herein, this minimum desired spacing is designated as φ.

As shown by FIGS. 1 and 2, the coordinatable system of the present invention, generally indicated by reference numeral 10, includes a plurality of ground tracks 12, accommodating coordinated sets of satellites, representative examples of which are indicated by reference numerals 14 (FIG. 2). Each set includes at least one satellite 14. All satellites 14 operate in geosynchronous orbits about the Earth. For reference purposes, in FIGS. 2 and 9, the geostationary belt is indicated by plus (+) characters.

As mentioned, the path traveled by a satellite 14 in each orbit projects a respective imaginary ground track 11 upon the surface of the Earth. The maximum latitude attained by each ground track is equal to the inclination of the respective orbit. The set of satellites 14 associated with each ground track is coordinated with that associated with each other ground track to maximize the total number of satellites 14 allowable in a specified service area. The set is also coordinated to maintain a specific minimum separation angle as seen from any point within the service area.

The coordinatable system is built up from a hierarchy of building blocks, which include ground tracks, orbits, satellite-populated ground tracks, nested sets of ground tracks, and longitudinally spaced sets of ground tracks. All of these are defined by a number of parameters, which include period or semimajor axis, inclination, eccentricity, longitude of symmetry and longitude of ascending node, argument of perigee, true anomaly (or time since perigee). Parameter choices can be made to create a family of orbits in each ground track, as well as various ground tracks. Parameter choices are limited by constraints at a given level and in some cases by constraints or choices at higher levels.

Inherent in this invention is the underlying characteristic that periods of all the constituent orbits are geosynchronous. Satellites operating in the inclined geogynchronous orbits of the present invention have the same period of rotation as does the Earth that is, one sidereal day. The period is 23.93447 hours, or about 23 hours and 56 minutes, identical to that for geostationary satellites, so that the ground track repeats daily (with occasional fine adjustments by ground control, which is also the case for GSO's) within a confined region of longitudes.

Because it reflects the orbital motion of the satellites relative to the rotating Earth, the lowest level of building block hierarchy is the ground track. As indicated in the examples shown by FIGS. 3 and 4, geosynchronous satellites traverse repeating ground tracks whose shapes are a function of inclination, eccentricity and argument of perigee. The position of the ground track's longitude of symmetry is a specific design choice.

Figure 3:
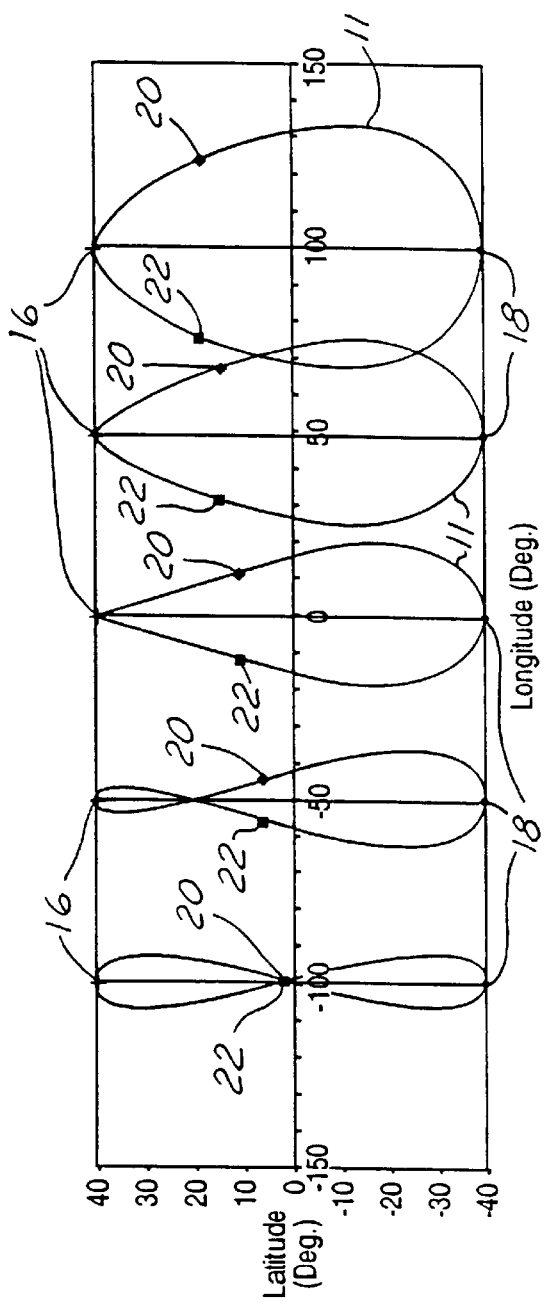
FIG. 3 is a graphic representation of several possible ground track shapes as a function of eccentricity.

In FIG. 3, from left to right, the ground tracks shown are associated with orbital eccentricities of 0.000, 0.070, 0.140, 0.210 and 0.280 respectively, with 40 degrees inclination.

Figure 4:
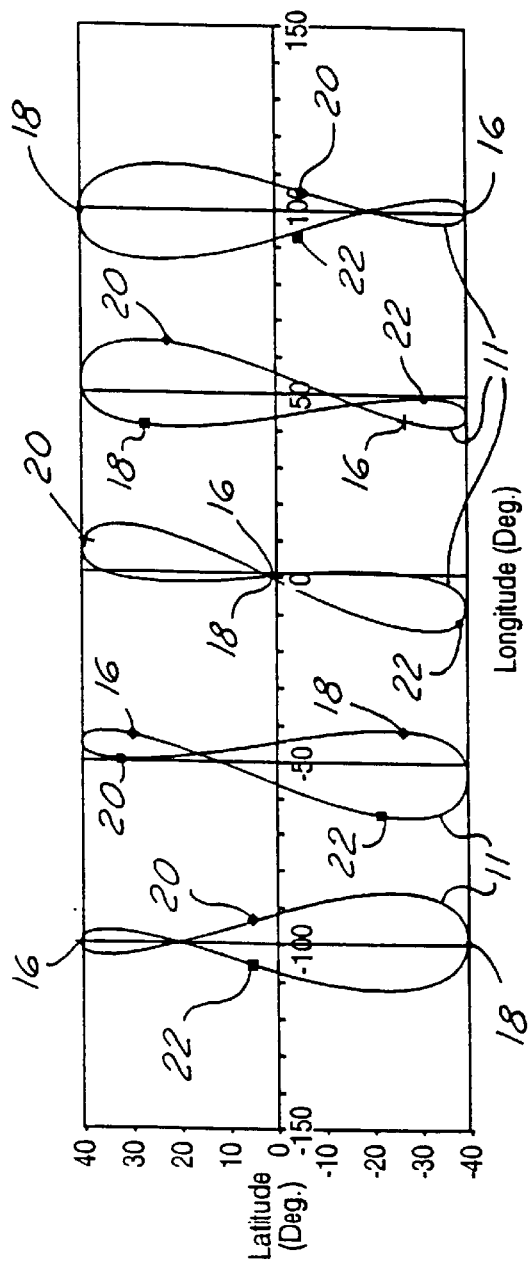
FIG. 4 is a graphic representation of several other possible ground track shapes as a function of argument of perigee.

In FIG. 4, from left to right, the ground tracks shown are associated with arguments of perigee of −90.0 degrees, −45 degrees, 0.0 degrees, 45.0 degrees and 90.0 degrees respectively, while the inclination is 40 degrees and the eccentricity is 0.07.

It should be understood that the foregoing values associated with FIGS. 3 and 4 are but examples used for purposes of explanation and are not represented herein as being universally ideal. In FIGS. 3 and 4, apogee 16 is indicated by plus (+) characters, perigee is indicated by dots 18, true anomaly of 90 degrees (6 hours) is indicated by dots 20 and true anomaly of −90 degrees (−6 hours) is indicated by dots 22.

FIG. 3 illustrates preferred ground track shapes, which embody even symmetry about a vertical axis. These are created by choosing an argument of perigee of −90 degrees. This choice favors the Northern Hemisphere with a dwell time of more than 50 percent. The preferred embodiment uses a moderate eccentricity, that is, an eccentricity large enough to prevent self-crossing of the ground track, to maximize the number of satellites that can occupy the ground track while maintaining the required separation angle φ.

FIG. 4 depicts examples of other ground track shapes that are possible through adjustment of the argument of perigee. At an argument of perigee of +90 degrees, ground tracks mirroring those of FIG. 3 favor the Southern Hemisphere.

It is important to note that each ground track represents a substantially unlimited number of possible satellite orbits, differentiated in time. Each orbit defines an ellipse on a plane that is equally inclined with respect to the equatorial plane of the Earth. The orientation of each orbit plane is expressed by the inclination and the longitude of the ascending node.

At the next hierarchical level, the orbital parameters of each individual satellite tracing the specified ground tracks require specification. The time since perigee, or true anomaly (the angle about the Earth's center, in the orbit ellipse) is a design choice, as is the corresponding positioning of the desired longitude of symmetry.

A number of alternative but equivalent parameter sets (alternate coordinate frameworks and transformations) may also be used to describe the system. The present set based on the geographically fixed, repeating ground tracks is believed to be the easiest descriptor set with which to understand the concept.

Defining the orbits of a set of multiple satellites in the same repeating ground track necessitates specifying additional parameters. The number of satellites in a track, preferably equally spaced in time (with other possibilities acknowledged), is a design choice constrained by the required separation angle φ.

Figure 5:
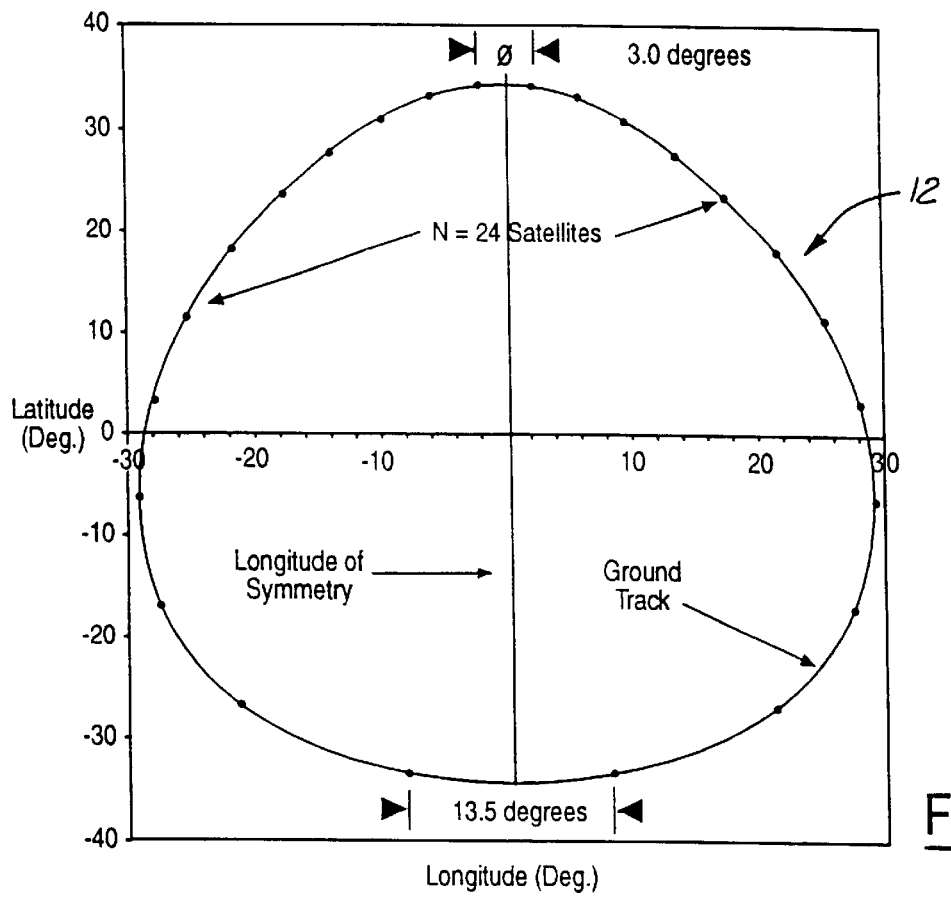
FIG. 5 is a graphic representation of multiple satellites, increasing the system capacity, in a ground track at an instant in time, key parameters being indicated.

FIG. 5 illustrates, at an instant in time multiple satellites, thereby increasing the system capacity within a single ground track, and indicates key parameters. Shown is a ground track associated with orbits having an inclination of 35 degrees, an eccentricity of 0.251, an argument of perigee of −90 degrees and a longitude of symmetry of 0 degrees.

Figure 6:
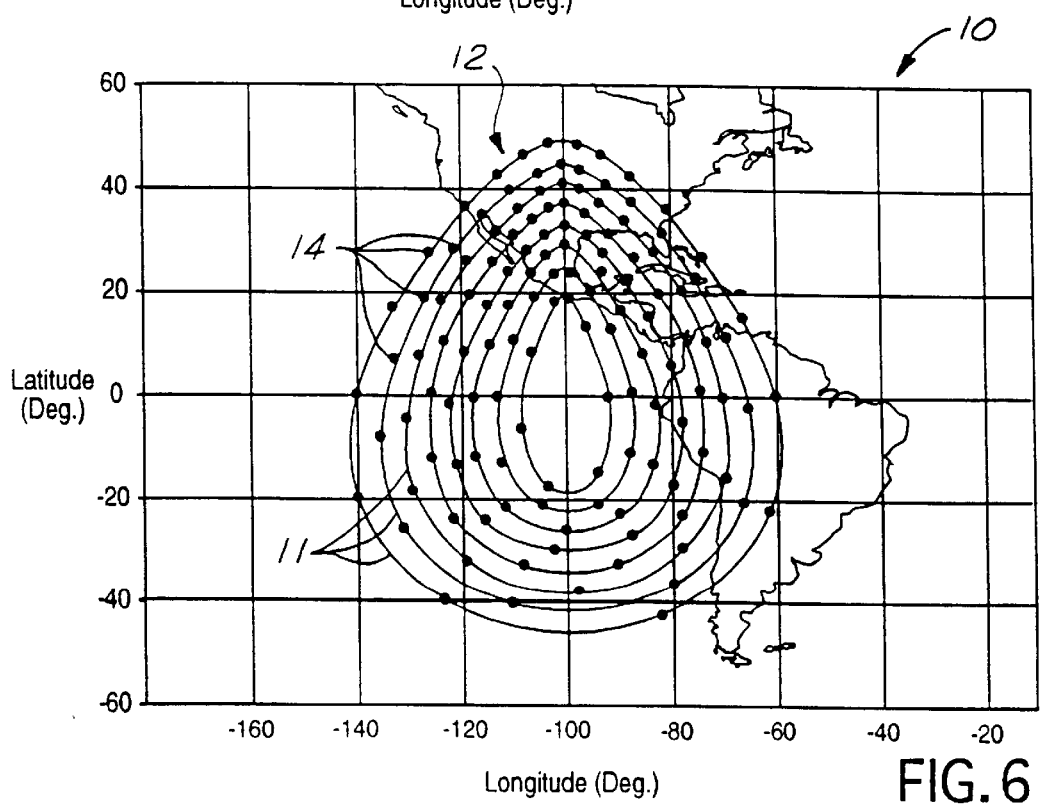
FIG. 6 is a graphic representation of multiple, multiple-occupied ground tracks, increasing the system capacity, nested about the same longitude of symmetry.

Multiple sets of ground tracks, each with multiple satellites, may be nested successively within one another as shown by FIG. 6. As in FIG. 2, representative examples of the satellites are indicated by reference numerals 14. The spacing between ground tracks is chosen through selection of each ground track's shape parameters. The preferred method is conservative, allocating a complete guard band of width φ or more in all orientations between ground tracks at every point. With this approach, the phasing within each ground track is independent of the others. It should be understood by those skilled in the art or which the present invention is a part that other values of eccentricity and closer spacing and intertrack phase synchronization may be chosen without departing from the scope and spirit of the present invention.

Figure 7:
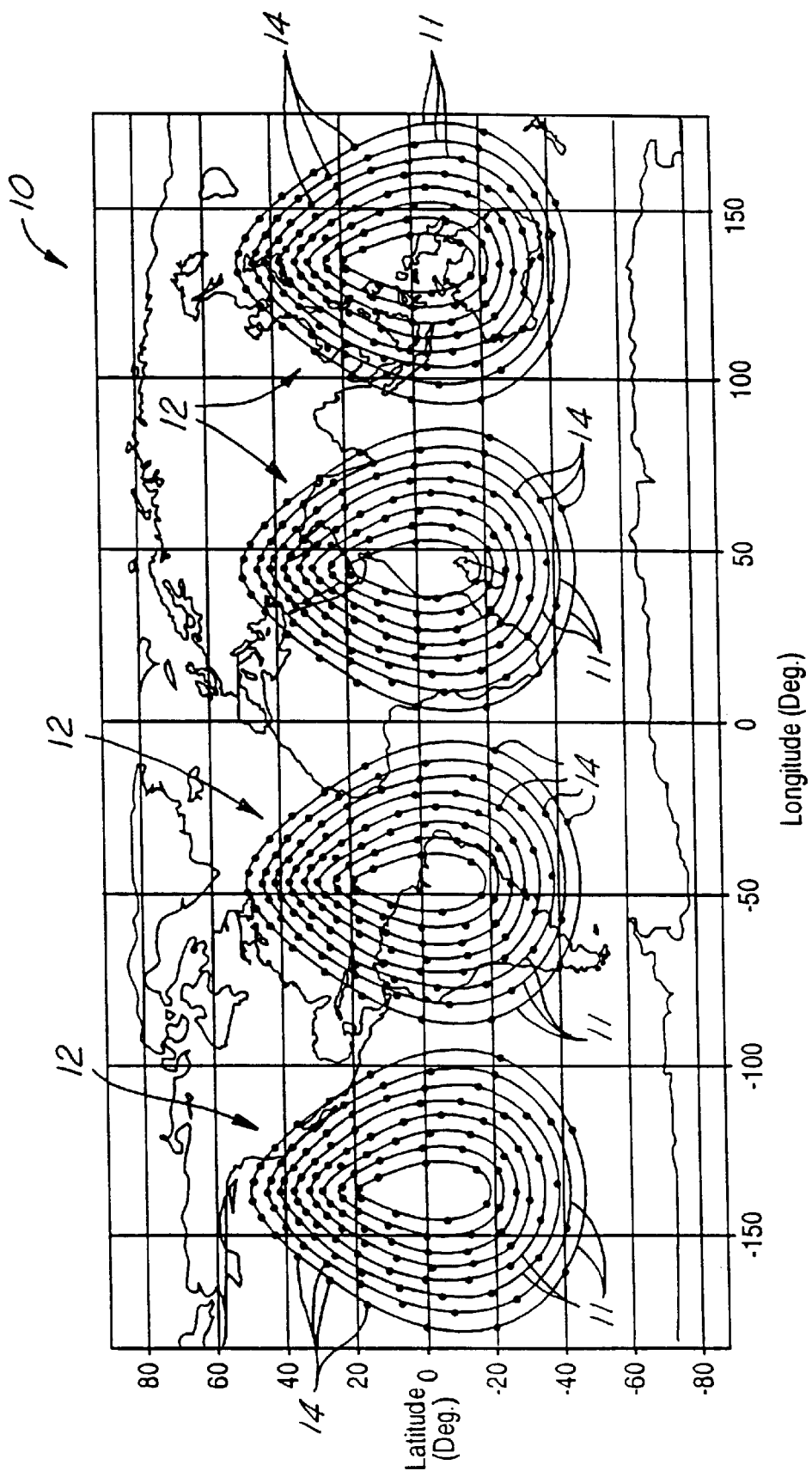
FIG. 7 is a graphic representation of multiple, multiple-occupied ground tracks, increasing the system capacity, spaced in longitude.

Additional coordinatable capacity is realized by adding multiple sets of multiple ground tracks with multiple satellites, spaced in longitude as depicted by FIG. 7 to provide worldwide coverage. As in FIG. 2, representative examples of the satellites are indicated by reference numerals 14. Intersatellite crosslinks may be incorporated within constituent subsystems to provide global communications linkages.

Figure 8:
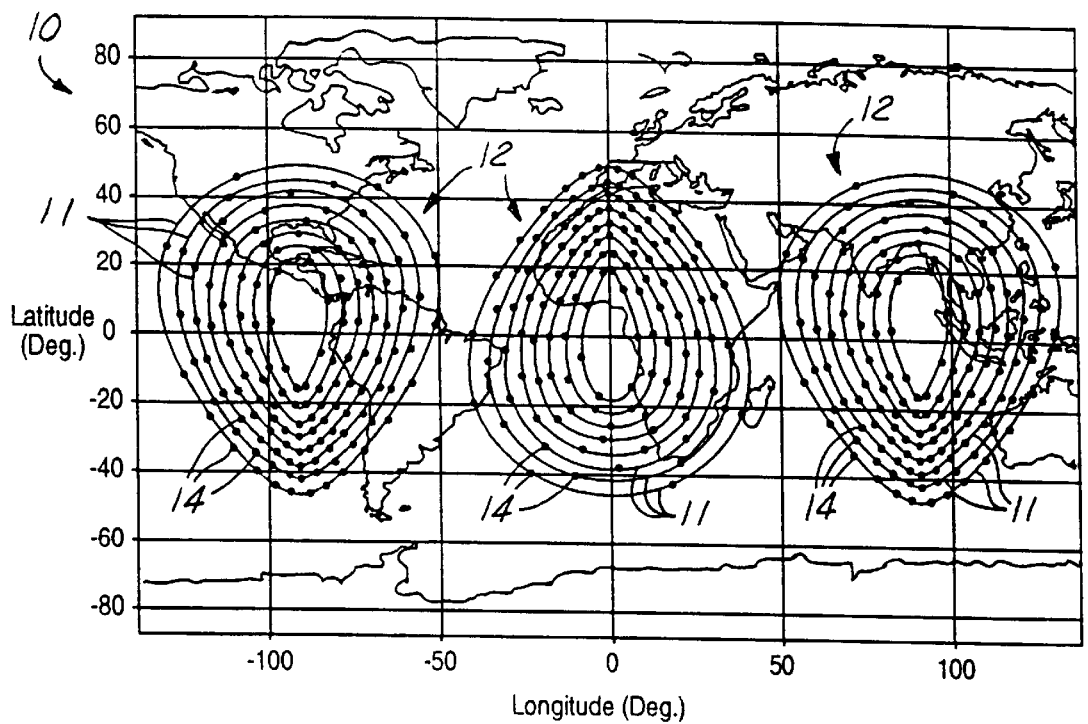
FIG. 8 is a graphic representation of an alternate set of longitudinally spaced sets of multiple, multiple-occupied ground tracks.

The sets of longitudinally spaced tracks need not be identical; FIG. 8 provides such a counter-example in which some nested groups are inverted (their arguments of perigee being +90 degrees) relative to others. As in FIG. 2, representative examples of the satellites are indicated by reference numerals 14. Many other combinations of parameters are possible within the context of this disclosure.

In addition to the very high total capacity for frequency re-use mentioned in the foregoing, the coordinatable system of inclined geosynchronous orbits provides an important performance benefit. The inclined geosynchronous orbits offer users higher elevation angles (than geostationary orbits) for long durations per satellite. The advantage is abetted, for Northern Hemisphere users, by the use of eccentricity with an argument of perigee of −90 degrees.

Figure 9:
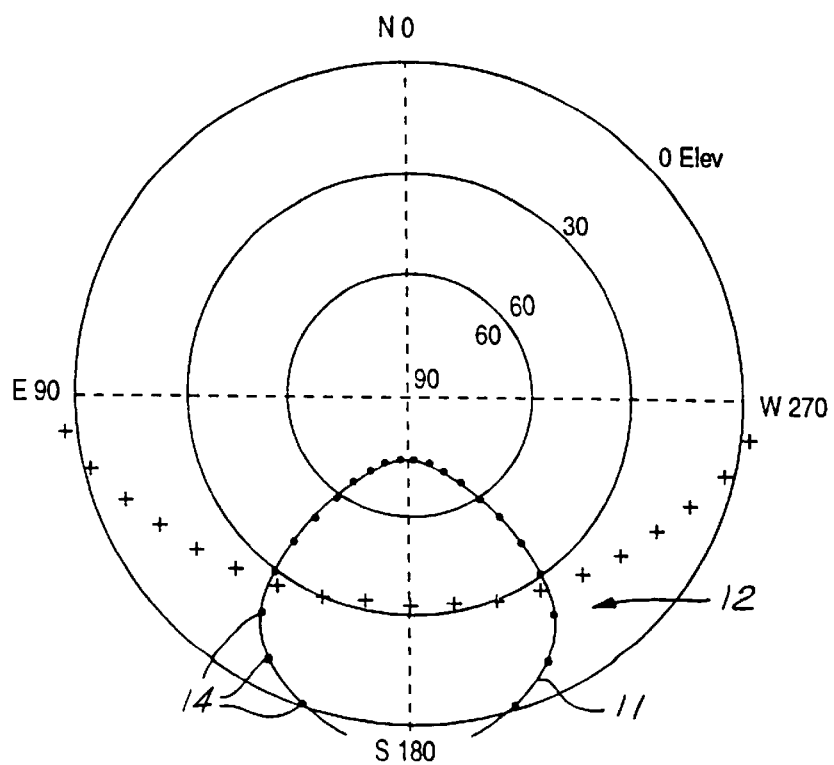
FIG. 9 is a graphic representation of the elevation angle advantage of an inclined geosynchronous orbit over a stationary orbit.

FIG. 9 illustrates the elevation angle advantage over geostationary orbits for a user at latitude 50 degrees north and 0 degrees longitude for the example ground track satellite set of FIG. 5. FIG. 9 is a view of the path traced across the sky by satellites associated with the ground track shown by FIG. 5. The path and the satellites are also respectively indicated by reference numerals 11 and 14 for convenient comparison. As in FIG. 2, representative examples of the satellites are indicated by reference numerals 14. The northerly bias of the inclined and elliptical ground track is made apparent by referring to FIG. 3, in which the 6-hour points are marked. Handoff, to another satellite at high elevation angles, is provided in the present invention with fewer satellites in the system and with longer dwell than with LEO's or MEO's. For reference purposes, in FIGS. 2 and 9, the geostationary belt is indicated by plus(+) characters.

The utilization factor of a satellite in one of the orbits of the present invention is necessarily less than that of GSO belt satellites, for which it is 100 percent, but exceeds those of the MEO and LEO satellites. Ground tracks with an eccentricity bias favoring the northern latitudes, generally with more than 50 percent utilization, are also usable in the southern latitudes for up to 40 percent utilization, only a few percent being lost in traversing the GSO belt, especially for the more highly inclined ground tracks.

In this disclosure, all parameters are subject to adjustment to produce an overall coordinatable system design that maximizes the total number of (moving) slots, subject to multiple criteria at each building block decision point.

The best mode illustrated herein is the best illustration of implementation at this time but may possibly be bested in some performance measures by alternate choices within the parameter sets and criteria stated.

While the invention has been described in detail, those familiar with the art to which this invention relates will recognize various alternative designs and embodiments for practicing the invention as defined by the following claims.

What is claimed is:

1. A satellite system, comprising:
   at least two sets of satellites, each set having at least one satellite, each one of said set of satellites traveling in a separate inclined eccentric geosynchronous orbit, wherein the separate orbits each have identical apogees and ground tracks associated with the separate orbits are nested about a first longitude of symmetry.

2. The satellite system of claim 1, further comprising at least one additional pair of sets of satellites spaced in longitude from the said at least two sets of satellites, the ground tracks associated with said at least one addition pair being nested one within another.

3. The satellite system of claim 2 wherein the satellites of said at least two sets and said at least one additional pair of sets have intersatellite crosslinks.

4. The satellite system of claim 3, wherein satellites in each one of said at least two sets can communicate with adjacent satellites in the same set, with at least one satellite in the other one of said at least two sets and with at least one satellite in said additional pair of sets using said intersatellite crosslinks to provide global communications coverage.

5. The satellite system of claim 2, wherein said at least two sets and said at least one additional pair of sets are not nested identically.

6. The satellite system of claim 1, wherein each set of said at least two sets of satellites is coordinated with the other set to maximize the total number of satellites allowable in a specified service area.

7. The satellite system for providing global communications coverage, comprising:
   a plurality of regional subsystems, each subsystem comprising a plurality of satellites orbiting in at least two nested inclined geosynchronous orbits, each satellite of said plurality of satellites having intersatellite crosslinks.

* * * * *